United States Patent
Østberg et al.

(10) Patent No.: US 6,335,474 B1
(45) Date of Patent: Jan. 1, 2002

(54) PROCESS FOR PRE-REFORMING OF OXYGEN-CONTAINING GAS

(75) Inventors: Martin Østberg, Roskilde; Jens-Henrik Bak Hansen, Lyngby; Poul Crik Iløjlund Nielsen, Fredensborg; Kim Aasberg-Petersen, Virum, all of (DK)

(73) Assignee: Haldor Topsoe A/S, Lyngby (DE)

( * ) Notice: Subject to any disclaimer, the term of this patent is extended or adjusted under 35 U.S.C. 154(b) by 0 days.

(21) Appl. No.: 09/639,595

(22) Filed: Aug. 16, 2000

(30) Foreign Application Priority Data

Aug. 19, 1999 (DK) ......................... 1999 01137

(51) Int. Cl.$^7$ ..................... C10G 59/02; C10G 35/04; C10G 35/06; C01B 3/24; C01B 3/26
(52) U.S. Cl. ............................ 585/943; 208/63; 208/65; 208/134; 208/138; 208/141; 518/70; 423/650; 423/651
(58) Field of Search ........................... 585/943; 208/138, 208/134, 63, 65, 141; 518/703; 423/650, 651

(56) References Cited

U.S. PATENT DOCUMENTS 4,844,837 A * 7/1989 Heck et al. .................. 252/373

FOREIGN PATENT DOCUMENTS

WO  WO9935082  7/1999

* cited by examiner

*Primary Examiner*—Walter D. Griffin
*Assistant Examiner*—Tam M. Nguyen
(74) *Attorney, Agent, or Firm*—Ostrolenk, Faber, Gerb & Soffen, LLP

(57) ABSTRACT

Process for the catalytic steam reforming of a hydrocarbon feed stock with a content of higher hydrocarbons and oxygen comprising the steps of catalytic pre-reforming the feed stock and steam reforming the pre-reformed feed stock, the pre-reforming step is carried out in presence of a fixed bed catalyst comprising at least a portion of a noble metal catalyst being active in oxidation of hydrocarbons to carbon oxides and conversion of higher hydrocarbons to methane, wherein the noble metal catalyst is supported on a carrier of MgO and/or $MgAl_2O_4$ spinel.

6 Claims, No Drawings

PROCESS FOR PRE-REFORMING OF OXYGEN-CONTAINING GAS

BACKGROUND FOR THE INVENTION

The present invention relates to a process for pre-reforming of a process gas e.g. natural gas, peak shaving gas, LPG etc. containing oxygen. Pre-reforming is a process being carried out prior to catalytic steam reforming in the production of hydrogen and/or carbon monoxide rich gas. In the pre-reforming step, content of higher hydrocarbons is converted to methane and the methane reforming reaction (1) and the water-gas shift reaction are equilibrated close to the operating temperature.

Oxygen in the feed gas to the above process results in oxygenated dehydration of the hydrocarbons and produces olefins. Pre-reforming catalysts are critical towards olefin concentration in the gas and will form carbon when the concentration exceeds certain critical values.

SUMMARY OF THE INVENTION

Partial oxidation of hydrocarbon feed with $H_2O$ or $CO_2$ in presence of oxygen over a transition metal catalyst and a noble metal catalyst is mentioned in WO 99/35082.

The general object of this invention is thus to improve the known processes for catalytic steam reforming of a hydrocarbon feedstock containing oxygen including a step of catalytically pre-reforming the feedstock without substantially formation of detrimental carbon on the pre-reforming catalyst.

In particular, the invention makes use of a noble metal catalyst being active in catalytic oxidation using the oxygen available in the inlet gas to oxidise hydrocarbons to carbon monoxide e.g. (3) and carbon dioxide e.g. (4) and having activity as a pre-reformer catalyst converting higher hydrocarbons to methane and equilibrating the methane ane reforming reaction (1) and water gas shift reaction (2).

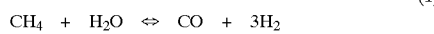
(1)

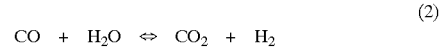
(2)

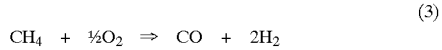
(3)

(4)

Exothermic catalytic oxidation reactions 3 and 4 are the prevailing reactions at inlet of a pre-reformer and release heat to the subsequent reactions, resulting in temperature increase of the process gas dependent on the oxygen content in the feed gas. When the content of oxygen in the process gas is consumed by the above reactions 3 and 4, the endothermic methane reforming reaction will be the main reaction leading to a decrease in process temperature. Because of heat formation through catalytic combustion reactions 3 and 4, the outlet gas will have a higher temperature and a higher methane reforming equilibrium temperature than in steam reforming process without oxygen in the inlet feed. The subsequent steam reforming step requires therefore less duty to obtain the same amount of hydrogen and/or carbon monoxide in the effluent gas from the steam reforming step.

In accordance with the above observations, the invention provides a process for the catalytic steam reforming of a hydrocarbon feed stock with a content of higher hydrocarbons and oxygen comprising the steps of catalytically pre-reforming the feed stock and steam reforming the pre-reformed feed stock. The pre-reforming step is carried out in presence of a fixed bed catalyst comprising at least a portion of a noble metal catalyst being active in oxidation of hydrocarbons to carbon oxides and conversion of higher hydrocarbons to methane. The noble metal catalyst is supported on MgO and/or $MgAl_2O_4$ spinel.

Suitable metals for use in the oxidation catalyst include at least one noble metal selected from Group VIII of the Periodic Table supported on a catalyst carrier of alumina, magnesia, titania, silica, zirconia, beryllia, thoria, lanthania, calcium oxide or compounds of mixtures thereof.

DETAILED DESCRIPTION

Catalysts containing noble metal for use in the process according to the invention are conveniently prepared by any of the methods conventionally used in the art, including impregnation of a carrier material with a noble metal containing aqueous solution and calcinating the impregnated material in air.

Carrier materials are usually selected from the group of alumina, magnesia, titania, silica, zirconia, beryllia, thoria, lanthania, calcium oxide and compounds of mixtures thereof. Preferred carrier materials are magnesium, alumina spinel and magnesium oxide.

The noble metal catalyst is typically arranged as fixed bed in a pre-reformer reactor.

Optionally, the noble catalyst may be employed as a top-layer in the pre-reformer reactor on a conventional pre-reforming catalyst.

The invention will further be described in the examples below.

EXAMPLE 1

Catalyst carrier materials of MgO and $MgAl_2O_4$ spinel with a particle size of 4.5 mm were impregnated with about 3% by weight Rh using an aqueous solution of rhodium nitrate and subsequent calcinated at 750° C., whereby nitrate was decomposed to oxides.

The above-prepared catalyst was arranged in fixed bed manner inside a reactor tube with a bed volume of 74.5 ml corresponding to 58.4 g of the catalyst. The reactor tube was placed in a five zone electrical heated oven to maintain substantially an isothermal temperature profile during the experiments.

The oven and inlet strings were heated in a nitrogen flow. When the predetermined operation temperature was obtained, steam was added and nitrogen was replaced with a flow of a premixed natural gas-air mixture and butane corresponding to the composition given in Table 1.

TABLE 1

| $CH_4$ vol % | $C_2H_6+$ vol % | $N_2$ vol % | $CO_2$ vol % | $O_2$ vol % | Ar vol % | Butane vol % | $H_2O$ vol % |
|---|---|---|---|---|---|---|---|
| 13.34 | 0.69 | 5.68 | 0.17 | 1.11 | 0.06 | 3.97 | 74.99 |

Composition of feed. $C_2H_6+$ denotes all hydrocarbons with 2 and more carbon atoms.

The total flow was approximately 380 Nl/h corresponding to a space velocity of about 5000 $h^{-1}$.

Experiments were carried out at an oven temperature of 450° C. and 480° C. Both experiments showed complete conversion of oxygen in the feed gas and nearly complete conversion of butane to methane (0–580 ppm$_v$ butane in the outlet on dry basis). At the same, time the equilibrium of the methane reforming reaction and the shift reaction was within 10° C. from the oven temperature.

It was observed that in the top of the reactor there was a zone with a higher temperature than the set-point temperature caused by the exothermal catalytic oxidation occurring while oxygen is present, this zone was followed by a zone with a lower temperature than the set-point temperature, slowly increasing towards the set-point temperature. This is caused by the endothermic methane reforming reaction.

EXAMPLE 2

A catalyst carrier of $MgAl_2O_4$ with about 10 wt % α-alumina and a particle size of 4.5×4.5 mm was impregnated with about 2% by weight Rh using an aqueous solution of rhodium nitrate and subsequent calcinated at 750° C., whereby the nitrate decomposed to oxides.

The catalyst was arranged in a fixed bed inside a reactor tube with a bed volume of 74.5 ml containing 79.8 g of the above prepared catalyst. The reactor tube was placed in a five zone electrical heated oven to maintain a substantially isothermal temperature profile during the experiments.

The oven and inlet strings were heated in a nitrogen flow. When the operation temperature was obtained, steam was added and nitrogen was replaced by a flow of a premixed natural gas-air mixture and butane corresponding to the composition given in Table 2.

TABLE 2

| $CH_4$ vol % | $C_2H_6$+ vol % | $N_2$ vol % | $CO_2$ vol % | $O_2$ vol % | Ar vol % | Butane vol % | $H_2O$ vol % |
|---|---|---|---|---|---|---|---|
| 13.34 | 0.69 | 5.68 | 0.17 | 1.11 | 0.06 | 3.97 | 74.99 |

Composition of feed. $C_2H_6$+ denotes all hydrocarbons with 2 and more carbon atoms.

The total flow was approximately 380 Nl/h giving a space velocity of about 5000 h$^{-1}$.

Experiments were carried out at an oven temperature of 450° C. The experiments showed complete conversion of the oxygen and complete conversion of butane to methane. At the same time, the equilibrium of the methane reforming reaction was within 15° C. from the oven temperature, while the shift reaction had an negative approach from −20° C. to −60° C. meaning that the equilibrium temperature of the composition is higher than the reactor temperature.

The temperature profile through the reactor revealed a higher temperature than the set-point of the reactor at the inlet because of the consumption of oxygen by exothermic reactions. Below this zone the temperature had decreased to around the set-point temperature because of the endothermic reforming reaction.

What is claimed is:

1. Process for the catalytic steam reforming of a hydrocarbon feed stock with a content of higher hydrocarbons and oxygen comprising the steps of:

catalytically pre-reforming the feed stock to form a pre-reformed feed stock; and steam reforming the pre-reformed feed stock, wherein the pre-reforming step is carried out in presence of a fixed bed catalyst comprising at least a portion of a noble metal catalyst being active in oxidation of hydrocarbons to carbon oxides and conversion of higher hydrocarbons to methane, and wherein the noble metal catalyst is supported on a carrier of $MgAl_2O_4$ spinel.

2. The process of claim 1, wherein the noble metal catalyst comprises at least one noble metal from Group VIII of the Periodic Table.

3. The process of claim 2, wherein the noble metal catalyst is rhodium.

4. The process according to claim 1, wherein the noble metal catalyst is arranged as top layer in the fixed bed catalyst.

5. The process according to claim 2, wherein the noble metal catalyst is arranged as top layer in the fixed bed catalyst.

6. The process according to claim 3, wherein the noble metal catalyst is arranged as top layer in the fixed bed catalyst.

* * * * *